UNITED STATES PATENT OFFICE.

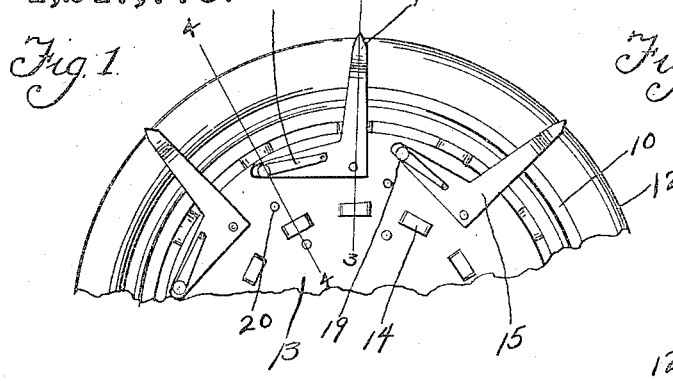
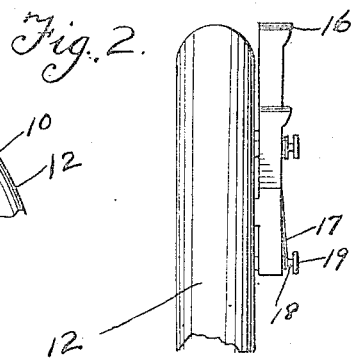
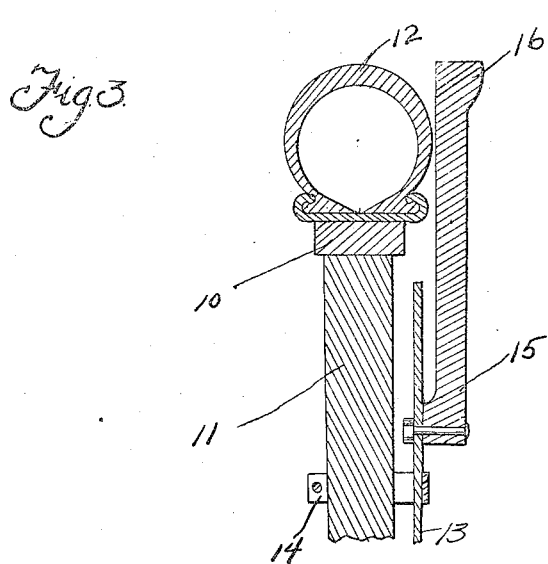
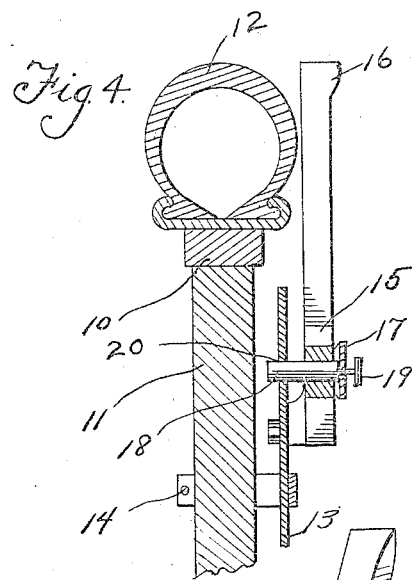
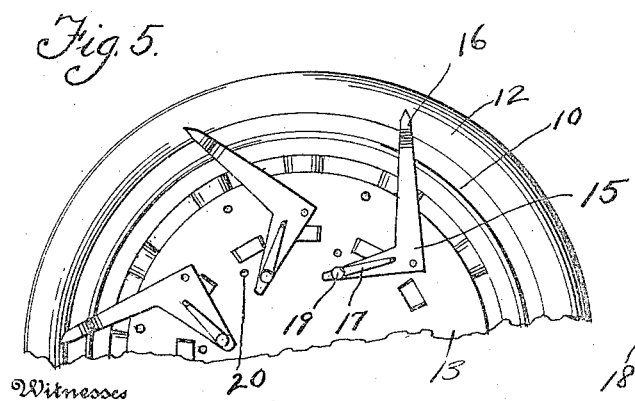
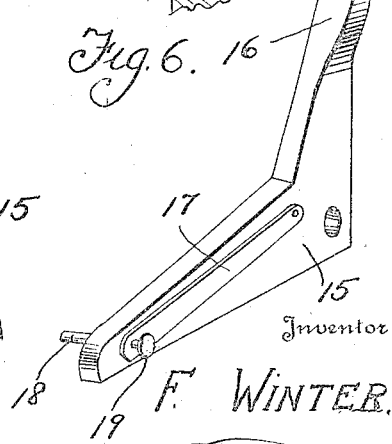

FREDERICK WINTER, OF HOLLEY, NEW YORK.

ANTISKIDDING DEVICE.

1,247,775.      Specification of Letters Patent.      Patented Nov. 27, 1917.

Application filed May 15, 1917. Serial No. 168,781.

*To all whom it may concern:*

Be it known that I, FREDERICK WINTER, a citizen of the United States, residing at Holley, in the county of Orleans, State of New York, have invented certain new and useful Improvements in Antiskidding Devices; and I do hereby declare the following to be a full, clear, and exact description of the invention, such as will enable others skilled in the art to which it appertains to make and use the same.

This invention relates to improvements in anti-skid devices, and particularly to devices of this character which are used in connection with automobiles.

One object of the present invention is to provide a novel and simple device which can be quickly and easily attached to the rear wheels of the automobile to prevent the wheels from sliding sidewise on wet or icy streets or roads.

Another object is to provide a device of this character which will increase the traction of the rear wheels on ice, snow, or in muddy or sandy roads.

Other objects and advantages will be apparent from the following description when taken in connection with the accompanying drawing.

In the drawing:

Figure 1 is a side elevation of an automobile wheel showing my invention applied thereto, and with the traction elements in extended position.

Fig. 2 is an elevation of the same parts shown in Fig. 1, but looking at the edge of the wheel.

Fig. 3 is an enlarged vertical sectional view taken on the line 3—3 of Fig. 1.

Fig. 4 is a vertical sectional view taken on the line 4—4 of Fig. 2.

Fig. 5 is a view similar to Fig. 1, showing the traction elements withdrawn into inoperative position.

Fig. 6 is an enlarged perspective view of one of the traction elements removed from the device.

Referring particularly to the accompanying drawing 10 represents an automobile wheel which includes the spokes 11 and the tire 12. Disposed on the outer side of the wheel is a large disk 13 which is secured to the spokes of the wheel by means of the clips, as illustrated. Pivotally mounted on the outer face of the disk, and adjacent the periphery thereof, are the angle members 15, the end of one arm of each of which is slightly thickened, as shown at 16, and has the edge portion sharpened for biting engagement with the surface of the street or road. On the outer face of the other arm is secured a leaf spring 17, the outer end of which has passing therethrough and through the end of the arm of the member 15, a pin 18, said pin being provided with a knob 19 which is adapted to be grasped to flex the spring outwardly. In the face of the disk, and arranged in an arcuate line concentric with the pivot point of the member 15, is a series of openings 20, these openings being arranged to receive the inner end of the said pin 18. Thus when the members 15 are to be projected into operative position the pins are pulled outwardly and the said members swung on their pivots and the pins then released so as to engage in the outermost of the series of openings 20. The springs retain the pins in the said openings.

It will thus be seen that when the automobile is to be driven over wet or icy streets or roads, the angle members 15 are moved into projected position, and that when the automobile turns a corner the said members will bite into the surface of the street or road and prevent skidding. Great assistance will also be given to the traction of the rear wheels of the automobile when passing over muddy or sandy roads.

What is claimed is:

An anti-skidding and traction device for an automobile wheel including a disk, means for detachably securing the disk to the wheel, a plurality of angle members pivotally mounted on one face of the disk adjacent the periphery thereof, one end of each of said members being arranged to bite into the road surface, the face of the disk being formed with openings adjacent one arm of each of the angle members, and a spring pressed pin carried by each of said angle members and arranged for successive engagement in the said openings.

In testimony whereof, I affix my signature in the presence of two witnesses.

FREDERICK WINTER.

Witnesses:
    CLARENCE D. CRANE,
    AMELIA WINTER.